US006141597A

United States Patent [19]
Botzko et al.

[11] Patent Number: 6,141,597
[45] Date of Patent: Oct. 31, 2000

[54] AUDIO PROCESSOR

[75] Inventors: Stephen C. Botzko, Reading; David M. Franklin, Maynard, both of Mass.

[73] Assignee: PictureTel Corporation, Andover, Mass.

[21] Appl. No.: 08/925,309

[22] Filed: Sep. 8, 1997

[51] Int. Cl.[7] .................................................... G06F 17/00
[52] U.S. Cl. .............................. 700/94; 381/119; 379/202
[58] Field of Search ................................ 381/119, 23, 22; 379/202; 364/400.01; 700/94; 704/275, 500, 503

[56] References Cited

U.S. PATENT DOCUMENTS

| | | | |
|---|---|---|---|
| 5,309,517 | 5/1994 | Barclay | 381/119 |
| 5,483,528 | 1/1996 | Christensen . | |
| 5,487,067 | 1/1996 | Matsushige . | |
| 5,530,699 | 6/1996 | Kline | 379/202 |
| 5,533,112 | 7/1996 | Danneels | 379/202 |
| 5,647,008 | 7/1997 | Farhangi et al. | 381/119 |
| 5,737,321 | 4/1998 | Takahashi | 379/202 |
| 5,774,457 | 6/1998 | Iizawa | 379/202 |

Primary Examiner—Vivian Chang
Attorney, Agent, or Firm—Fish & Richardson P.C.

[57] ABSTRACT

A method and apparatus for distributing audio signals from one of a plurality of audio sources to an output connect compressed audio signals from each one of the plurality of audio sources to an audio processor. Uncompressed audio signals are derived from the compressed audio signals. The compressed audio signal from one of the plurality of audio sources is selectively coupled to the output based upon the uncompressed audio signals. In a preferred embodiment, the compressed audio signal from one of the plurality of audio sources is coupled to the output selectively in accordance with speech information detected in the uncompressed audio signals from the plurality of audio sources. The method and apparatus include mixing, selectively, the uncompressed audio signals from the plurality of audio sources into a composite uncompressed audio signal; compressing the uncompressed composite signal into a corresponding compressed composite signal; and connecting the compressed composite signal or the selected one of the compressed audio signals to the output selectively in accordance with the uncompressed audio signals. In a preferred embodiment of the invention, the compressed composite signal is fed to the output when speech audio signals are detected from more than one source and the selected one of the compressed audio signals is coupled to the output when speech is detected from only one of the sources.

10 Claims, 8 Drawing Sheets

AUDIO PROCESSOR

BACKGROUND OF THE INVENTION

This invention relates generally to audio processors and more particularly to audio processors for use in audio or audio/videoconferencing systems.

As is known in the art, one of the key components in an audio or audio/videoconferencing system is the audio processor. The audio processor is responsible for receiving audio from various sites connected to the conference system and for distributing the audio to the various sites.

There are two classic types of audio processors: an audio switch and an audio mixer. With the audio switch, time compressed audio data from one site is sent to none, or to one or more of the other sites. These audio switches are used, for example, with sites that use a "push-to-talk" method and send time compressed audio when there is speech, or some audible signal, which is to be communicated. In some audio switches, the "push-to-talk" at the site is automatic, thereby removing the requirement that the user actually "push" a button. In any event, the audio switch does not actually decode the time compressed audio signal; rather, it simply decides which audio source each site will receive and then routes the time compressed audio to the appropriate site or sites. The switch operation can be based on one, or a combination, of the following: a control protocol which allows the users to request to speak; a control protocol which allows the users to request to hear a particular site; and, a decision mechanism which forwards the audio received from one site to the other sites. Usually the audio switch is configured so that no site will receive the audio it is transmitting.

The audio switch is very efficient to implement because it is not required to decode the time compressed audio signals. Thus, a single conferencing server, or bridge, can support a large number of sites. Further, the audio switch does not degrade the audio signal due to transcoding (that is, decompression followed by compression of the decompressed signals) or other signal processing losses because it simply routes the time compressed audio as the audio switch receives it. Still further, the audio switch has a relatively low time delay because transcoding is not required.

On the other hand, because the audio switch does not decode its received, time compressed audio, but merely passes it to a site, or sites, decisions about how to route the time compressed audio are limited. In particular, because the input to the switch is time compressed audio, the switch cannot use acoustic energy detection techniques in making routing decisions. Further, if there are speaking participants at more than one site, the audio switch must select only one of the sites as the source of the audio to be passed through the switch. To put it another way, the audio at the various sites cannot be mixed because the switch simply routes the time compressed audio from the sites.

An audio mixer operates with non-time compressed, that is, uncompressed, audio. For each site in the conferencing system, the audio mixer combines the audio from selected other sites and re-encodes (that is, time compresses) the combined audio so that it can output time compressed, mixed audio to a receiving site. With a large number of sites, a selector is used to select only a few of the sites, discarding unselected sites, to thereby reduce noise. Because uncompressed audio is available at the selector, the selection can be made based on the relative amount of acoustic energy in the audio received from the sites by the selector. Other signal processing techniques can also be used to make the decision.

With an audio mixer, when participants at more than one site are speaking, they can be heard by participants at the other sites. On the other hand, the audio mixer must decompress, mix, and then re-compress the received audio. This three step process degrades the quality of the original audio, an effect which can become particularly objectionable if multiple conferencing servers are cascaded together to serve a single meeting. Further, the signal processing adds delay to the audio propagation. Still further, once the audio signals are mixed they cannot be un-mixed thereby limiting the topologies available for distributed conferencing servers.

SUMMARY OF THE INVENTION

In accordance with one feature of the invention, a method is provided for distributing audio signals from one of a plurality of audio sources to an output. The method includes the steps of feeding compressed audio signals from each one of the plurality of audio sources to an audio processor. The processor decompresses each received audio signal. The compressed audio signal from one of the plurality of audio sources is coupled to the output selectively based upon the uncompressed audio signals from the plurality of audio sources. In a preferred embodiment, the compressed audio signal from one of the plurality of audio sources is coupled to the output selectively based upon speech information detected in the uncompressed audio signals from the plurality of audio sources.

In accordance with another feature of the invention, the method includes the step of selectively mixing the uncompressed audio signals from a plurality of the audio sources into an uncompressed composite audio signal; compressing the uncompressed composite signal into a corresponding compressed composite signal; and feeding the compressed composite signal or the selected one of the compressed audio signals to the output, selectively, based upon the uncompressed audio signals. In a preferred embodiment of the invention, the compressed composite signal is fed to the output when speech audio signals are detected from more than one source and the selected one of the compressed audio signals is coupled to the output when speech is detected from only one of the sources.

In accordance with still another feature of the invention, an audio processor is provided for distributing audio signals from one of a plurality of audio sources to an output. The processor includes a switch fed by compressed audio signals from each one of the plurality of audio sources, for coupling one of the plurality of compressed audio signals to the output selectively in accordance with a control signal. A selector is fed by the uncompressed audio signals derived from the compressed audio signals from the plurality of audio sources for producing the control signal based upon the uncompressed audio signals from the plurality of audio sources. In a preferred embodiment, the selector couples the compressed audio signal from one of the plurality of audio sources to the output, selectively, based upon speech information detected in the uncompressed audio signals from the plurality of audio sources.

In accordance with another feature of the invention, the processor includes a mixer for combining uncompressed audio signals from a plurality of the audio sources into an uncompressed composite audio signal. An encoder is fed by the uncompressed composite signal for producing a corresponding compressed composite signal. A selector is provided for coupling either a selected one of the compressed audio signals or the compressed composite signal for coupling to the output, selectively, based upon the uncompressed audio signals. In a preferred embodiment of the invention, the selector couples either the compressed composite signal to the output when speech audio signals are detected from more than one source and the selected one of the compressed audio signals to the output when speech is detected from only one of the sources.

In another aspect, the invention relates to a method for distributing audio signals from one of a plurality of audio sources to an output. The invention features the steps of unicasting an audio signal from each of a plurality of audio sources to a plurality of first level audio bridge-servers; unicasting, from each said bridge-server, at least one audio signal to at least one second level audio signal bridge-server; and unicasting an output signal from each second level bridge-server, to at least one of said first level bridge-servers, and then to the audio sources. In an alternative embodiment, the last unicasting step can be replaced by the step of multicasting from said second level bridge-server, to at least one of the bridge-servers and the audio sources, a selected audio signal as the output.

In another aspect, the invention relates to a system for distributing audio signals from one of a plurality of audio sources to an output. The system features first transmitters unicasting an audio signal from each of a plurality of audio sources to a plurality of first level audio bridge-servers; second transmitters unicasting, from each said first level bridge-server, at least one audio signal to at least one second level audio bridge-server; third transmitters unicasting from said second level bridge-server, to said first level bridge-servers, and fourth transmitters unicasting an output signal from the first level bridge-servers to the audio sources.

In another aspect of the invention, the third transmitters multicast a selected audio signal as the output from said second level bridge-server, to at least one of the first-level bridge-servers and the audio sources.

BRIEF DESCRIPTION OF THE DRAWING

These and other features of the invention, as well as the invention itself, will become more readily apparent from the following detailed description taken together with the accompanying drawings, in which.

DESCRIPTION OF THE PREFERRED EMBODIMENTS

Figure 1:
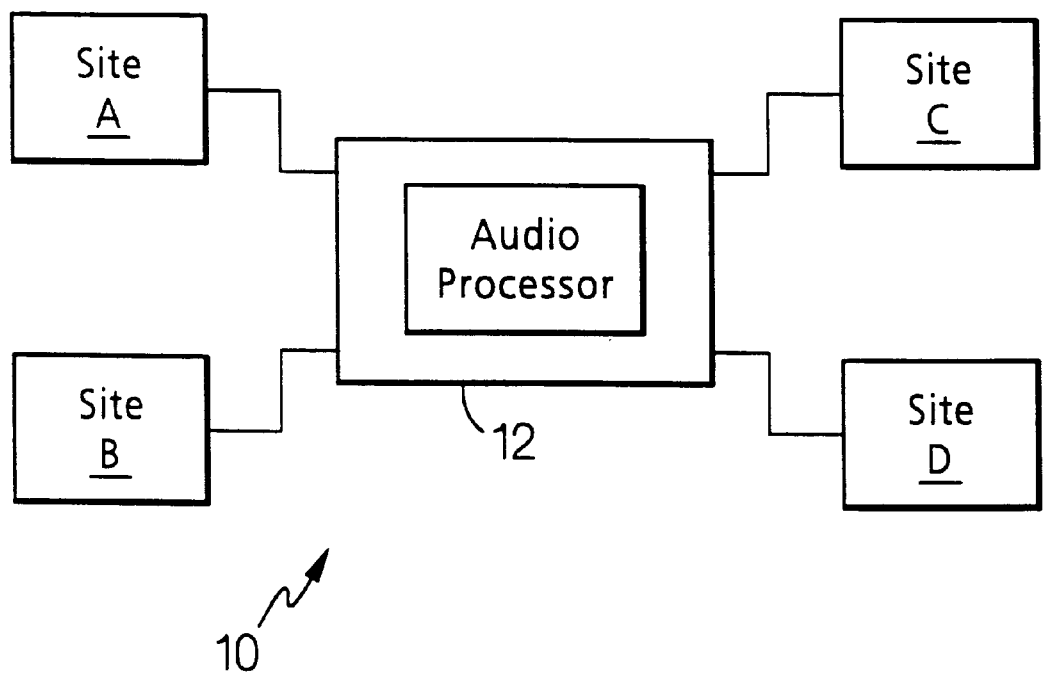
FIG. 1 is a block diagram of a bridged audio or video-conferencing system.

Referring now to FIG. 1, an audio conferencing system or the audio portion of an audio/video conferencing system 10 is shown wherein a plurality of sites, here for example four sites, SITE "A", SITE "B", SITE "C" and SITE "D" are connected together through a server, or bridge 12. Included in the bridge 12 are a plurality of audio processors 14a, 14b, 14c and 14d (FIG. 2) coupled to a corresponding one of the sites SITE "A", SITE "B", SITE "C", and SITE "D", respectively, as shown, for example through RTP/RTCP transport circuits. The audio data received from and sent to the various remote SITES A, B, C, and D from the bridge 12 is compressed audio, typically compressed audio packets. The bridge 12 operates to selectively forward, and/or mix, the audio from the various SITES so that each SITE can participate in a conference. While four SITES are shown in this illustrated embodiment, more or fewer SITES can be handled. In addition, while the bridge 12 in the illustrated embodiment of the invention operates primarily in software, the bridge can be implemented in hardware, software, or a combination of the two (except, of course, for the analog operations which are described below). While illustrated as direct connections, the SITES can connect to the bridge in many different ways, for example, through the public switched telephone network, by wireless, by direct connection, or in any other desired combination of the various communication paths including, for example, a local area network.

Figure 2:
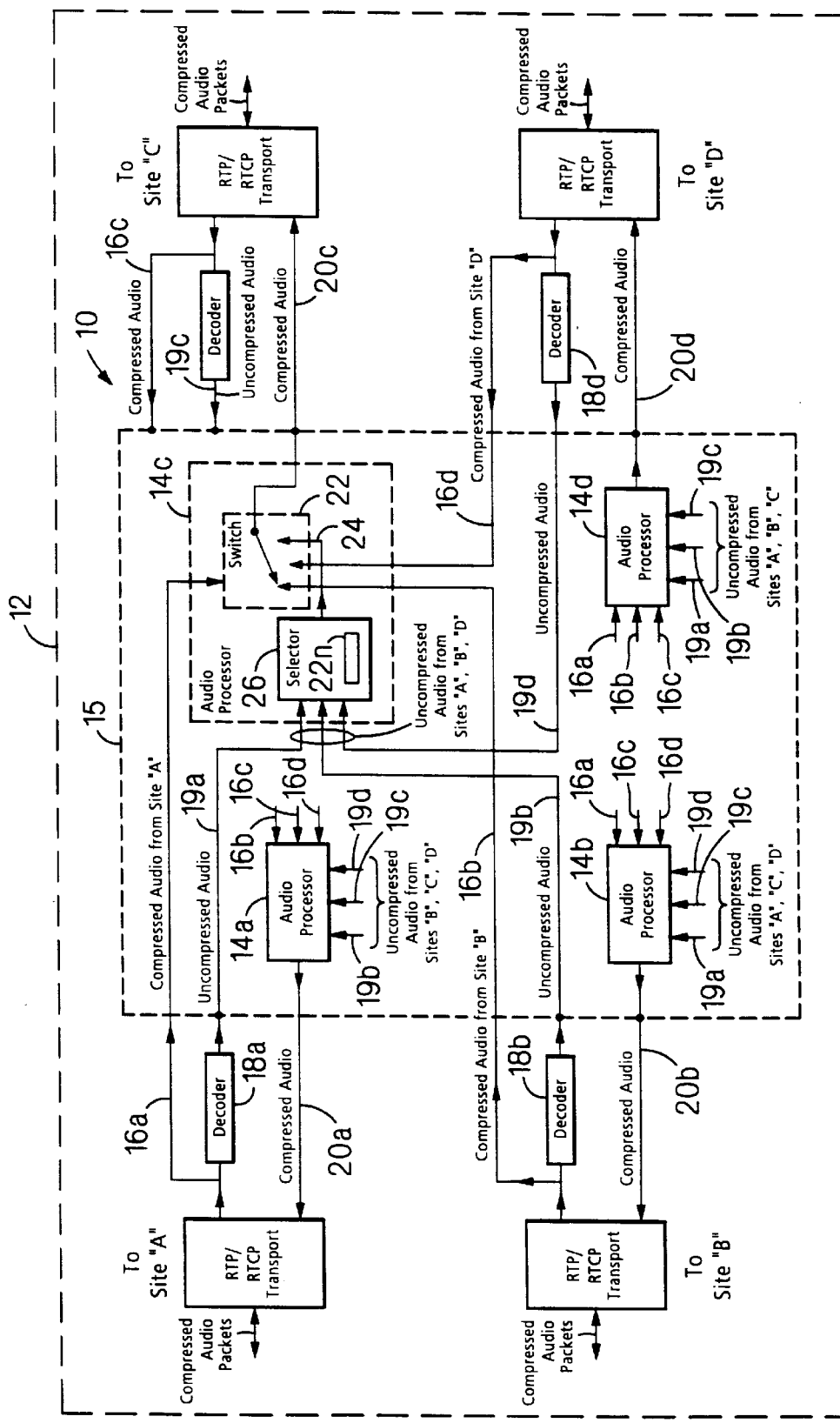
FIG. 2 is a block diagram of a conferencing system having an audio processor according to the invention.

Referring to FIG. 2, in a first particular embodiment of the invention, each one of the audio processors 14a–14d is identical in construction. An exemplary one thereof, here audio processor 14c is shown in detail. In this embodiment of the invention, each one of the audio processors 14a–14d distributes audio signals from others of the plurality of sites to its one connected site. Thus, considering SITE "C", the corresponding audio processor 14c distributes audio signals from one of the SITES "A", "B", and "D" to SITE "C".

More particularly, each one of the SITES "A"–"D", transmits and receives time compressed audio packets, here, for example, through an RTP/RTCP transport. It should be understood, however, the other transports may be used and that the audio signals to and from the sites need not be packet based. Time compressed audio signals from audio sources at the SITES "A"–"D", are fed to the audio processing section 15, of bridge 12 over lines 16a–16d, respectively, as shown. The time compressed audio signals on lines 16a–16d are also passed to time de-compressors, or decoders 18a–18d, respectively, as shown. The decoders 18a–18d produce corresponding de-compressed, or uncompressed, audio signals on lines 19a–19d, respectively. Both the time compressed and uncompressed audio signals on lines 16a–16d and 19a–19d, respectively, are fed to the audio processor section 15, as shown. The audio signals fed from the bridge 12 to the SITES "A", "B", "C", and "D", are fed to such SITES as time compressed audio signals on lines 20a–20d, respectively, from the audio processor section 15, as shown.

Referring in more detail to exemplary audio processor 14c, the audio processor 14c includes a switch 22 for receiving compressed audio signals on lines 16a, 16b, and 16d from each one of the plurality of SITES "A", "B" and "D", respectively. The switch 22 couples one of the plurality of compressed audio signals on lines 14a, 14b, 14d to SITE "C", selectively, in accordance with and based upon a control signal on line 24. A selector 26 is fed by the uncompressed audio signals on lines 19a, 19b, and 19d, from SITES "A", "B", and "D", respectively. The selector 26 includes a likelihood of speech detector and determines the one of the SITES "A", "B", or "D" with the highest likelihood of speech and thus produces the corresponding control signal on line 24. The one of the SITES "A", "B", or "D" having the highest likelihood of speech is thus coupled to SITE "C". In an application where SITE "C" may receive multiple audio streams, the selector 26 may be appropriately modified to select more than one of the SITES "A", "B", or "D" for coupling to SITE "C". It should be noted that an acoustic energy detector, or other device could be used as equivalent alternatives for the selector 26.

The computational efficiency of the audio processors 14a–14d is between the efficiency of a pure audio switch and an audio mixer. The audio processors 14a–14d decode all audio signals they receive, but they do not mix and re-time compress. The decoded, that is, uncompressed, audio is only used to provide drive information to the selector 26 which operates switch 22 to enable distribution of the compressed audio signals using the speech detector 22a in the selector 26. Also, the delay in the processors 14a–14d is likewise in between the delay of a pure audio switch and an audio mixer.

Further, because the audio processors 14a–14d switch time compressed audio signals without processing the compressed signals (that is, without decompressing them), the audio quality of the original audio signal stream is not degraded. This occurs even though the controlling signals to the selector 26 represent uncompressed audio. When the SITES connected to the bridge are normal end-points, which can receive one audio stream to play out of their loudspeakers, the SITES provide improved meeting dynamics compared with a pure audio switch. No matter how many streams are active, only the two loudest will be heard. The selectors operate so that the loudest is heard by everyone at all SITES "A"–"D", except the loudest which hears the second loudest. (Note that when the selector 26 at the loudest site selects its loudest input, that input is the "second loudest" input to the bridge.) When two participants at two different sites are having a discussion, they each hear each other. If they do not interrupt each other, everyone will hear the entire conversation. Note that this behavior does not depend on any special characteristics, such as detectors, or "push-to-talk" buttons, at the end-point SITES.

Some end-point SITES are able to receive more than one audio stream, and perform their own local mixing. Using this capability at an end-point SITE, an improved quality of service, over a traditional audio mixer, can be achieved. First, an extra encoder (mixing) step is not required at the audio processor 12 if the mixing is performed in the end-point SITE. This reduces delay and signal degradation. However, extra switches 22 and a more complex selector may be required. Also, end-point SITES typically can only receive (and mix) only a relatively small number of audio streams. This restriction limits the ability of the conferencing bridge to use the end-point's multiple stream capability; and in large conferences, the end-points quickly become overloaded.

The audio processors 14a–14d can provide a solution to this problem. Thus, the selector 26/switch(es) 22 will output the loudest speakers (more than one) in separate streams to the local mixing end-point SITES. The system can limit the number of streams it outputs to the number a SITE can receive. By automatically selecting the loudest speakers for the end-point SITES, the processors 14a–14d provide the highest possible signal quality, and avoid overloading the end-point SITES.

In another aspect of the invention, the loudest streams can be multicast to multiple SITES. That is, a single selection for the entire audio section 15 can receive all SITE audio and can control multiple switches 14, the output of which is multicast to all SITES. In this mode, each end-point SITE must automatically ignore its own transmitted stream. Also, the conferencing bridge 12 must ensure that the total number of multicast streams does not exceed the capacity of any SITE which is instructed to receive them.

Figure 2A:
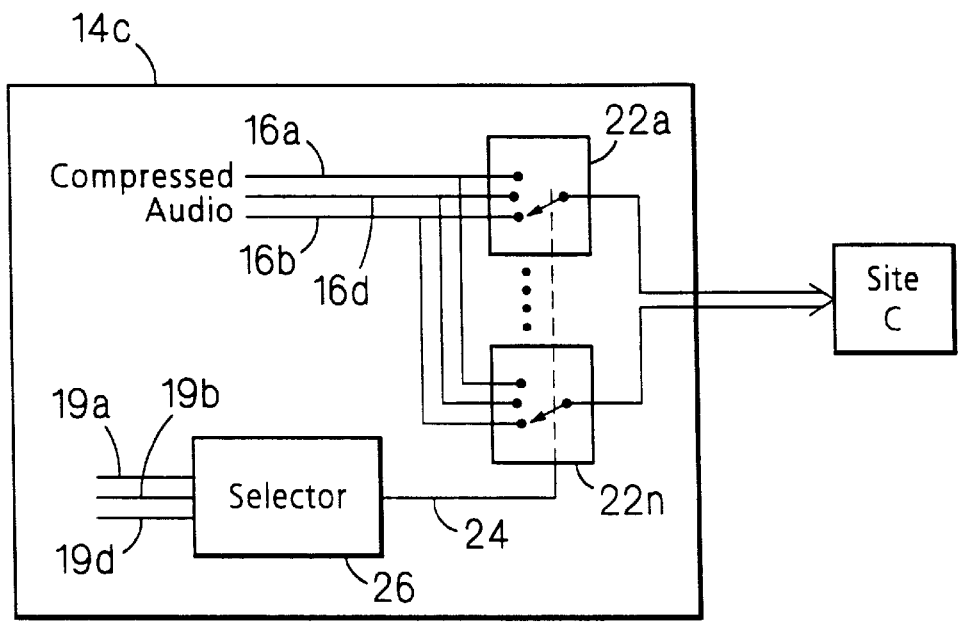
FIG. 2A is a block diagram of one particular configuration of the audio processor.
Figure 2B:
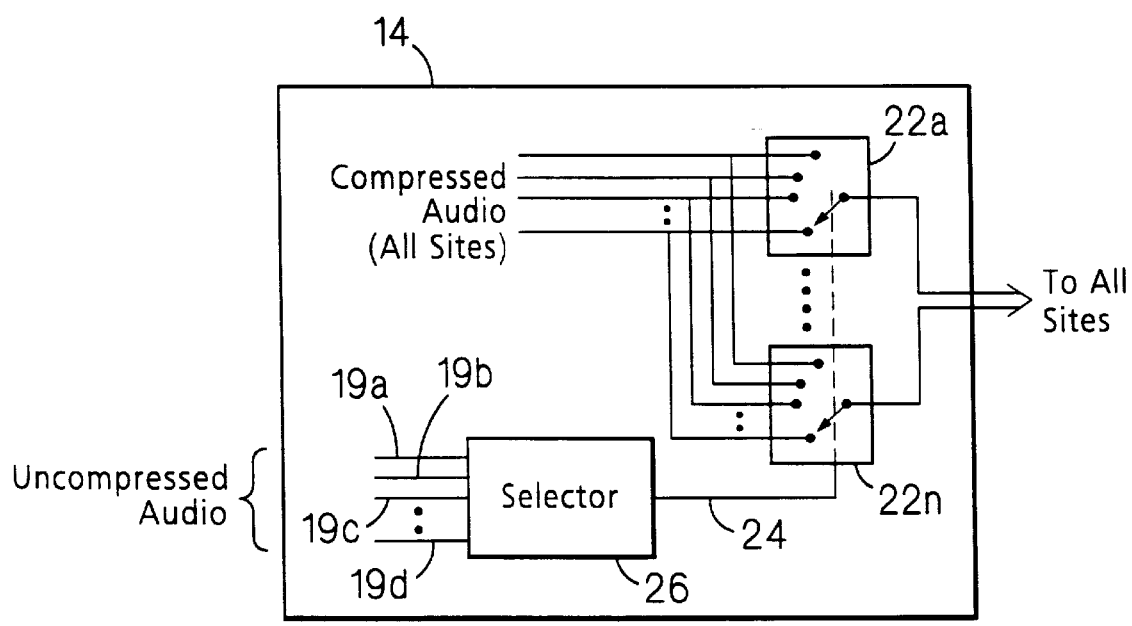
FIG. 2B is a block diagram of a second preferred configuration of the audio processor.

Thus, there are at least three useful applications for the audio processors 14a–14d when they are communicating with end-point SITES. First, each end-point SITE unicasts its audio stream(s) to the conferencing bridge 12. The bridge 12 selects, using selector 26, one or more streams at switches 22a, . . . , 22n, to unicast back to each end-point SITE. (See FIG. 2A) Second, each end-point SITE unicasts its audio stream(s) to the conferencing bridge 12. The bridge 12 selects, using selector 26, one or more streams at switches 22a, . . . , 22n, and multicasts the selected streams to all SITES. (See FIG. 2B) Third, each end-point SITE multicasts its audio stream(s). These can be received by the bridge 12, and also by other connected SITES. The bridge selects one or more streams, and multicasts them on a separate multicast address. Combinations of these approaches are certainly possible, especially in situations where only some SITES can receive multicast transmissions.

Figure 2C:
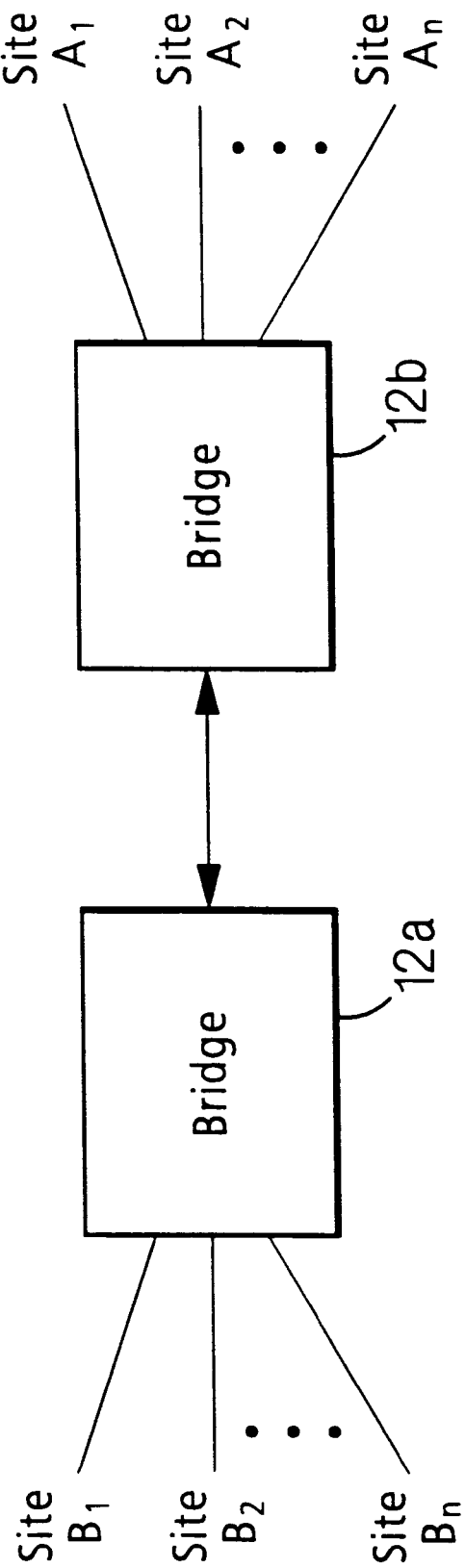
FIG. 2C is a schematic block diagram of a cascaded bridge connection in accordance with the invention.
Figure 2D:
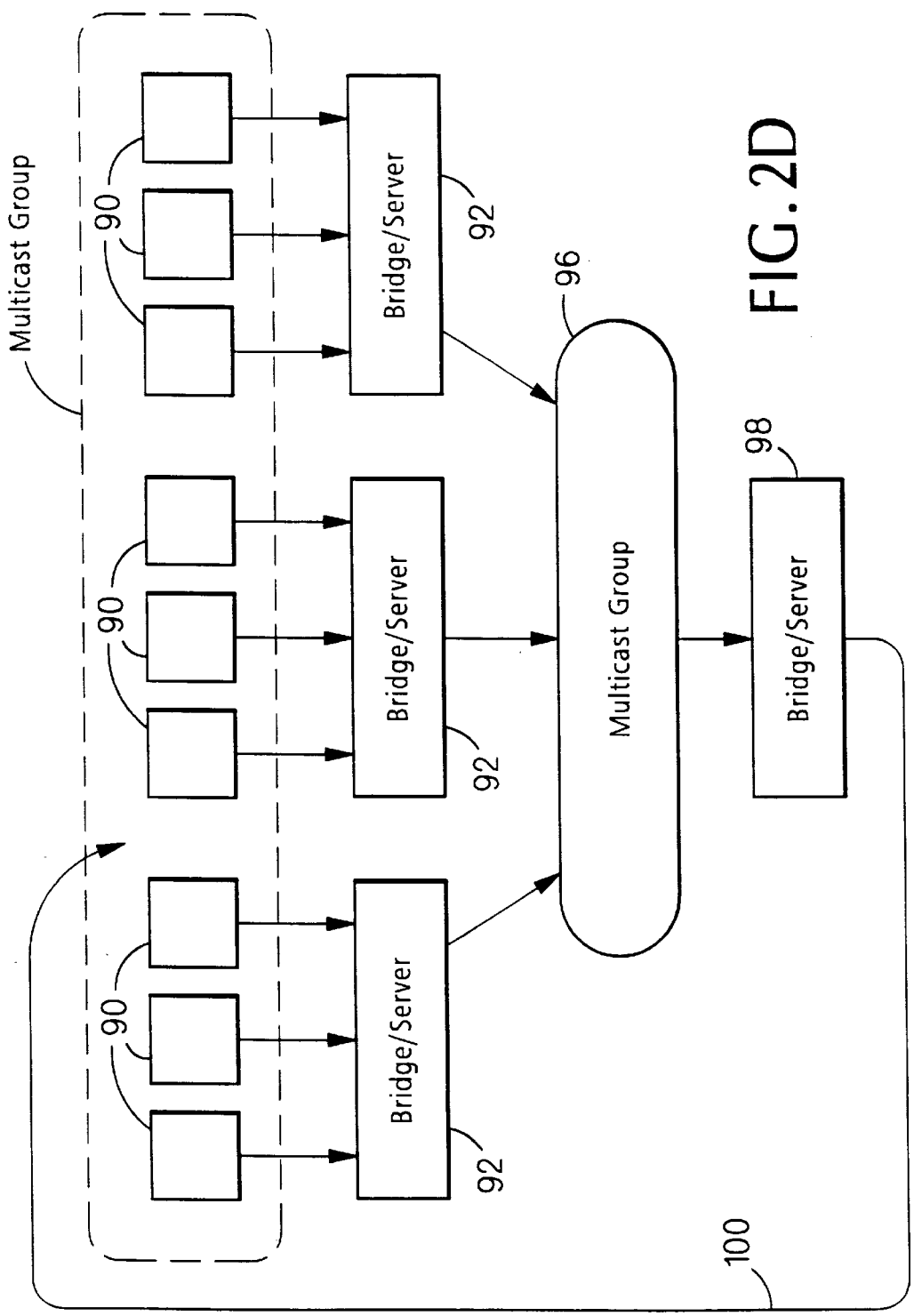
FIGS. 2D and 2E are schematic block diagrams of multi-level bridge topologies in accordance with the invention.
Figure 2E:
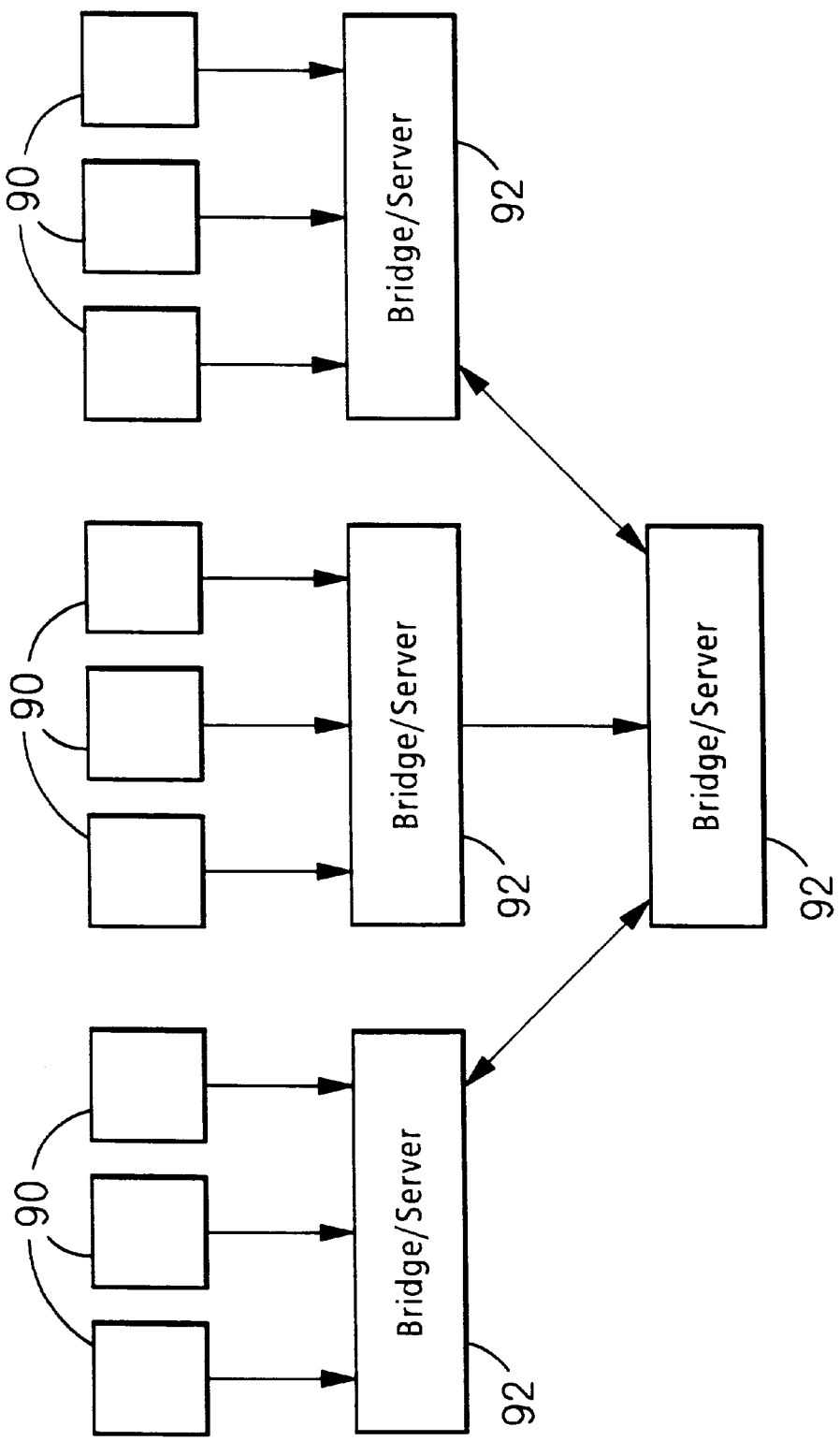

Another application of the audio processors 14a–14d is for the support of distributed conferences. A distributed (or cascaded) conference is run on multiple bridges. (See FIG. 2C) This, sometimes occurs because the conference is large. In other situations, the conference is distributed to optimize bandwidth usage. For instance, in a transatlantic conference, it is advantageous to minimize the amount of traffic actually traveling across the ocean. Using two conference bridges 12a and 12b (one in Europe, the other in North America, for example) accomplishes this goal. Each bridge acts as a SITE to the other bridge. The ability of the audio processors 14a–14d to select those audio streams which contain speech from the totality of streams, without degrading the audio, is very useful in distributed conferences. For instance, referring to FIG. 2D, the end-point SITES 90 in the conferences would unicast their audio to their bridge 92. Each bridge could then multicast the "active" audio streams to a multicast group 96. A second-level bridge 98 could then reexamine the active audio from the first-level bridge(s), and further reduce the number of streams. If needed, higher levels in the bridge hierarchy could be added. The end-point SITES can simply receive the multicast audio 100 from the top level bridge, here bridge 98. Other topologies are also possible (using only unicast transmission, for instance as illustrated in FIG. 2E).

Figure 3:
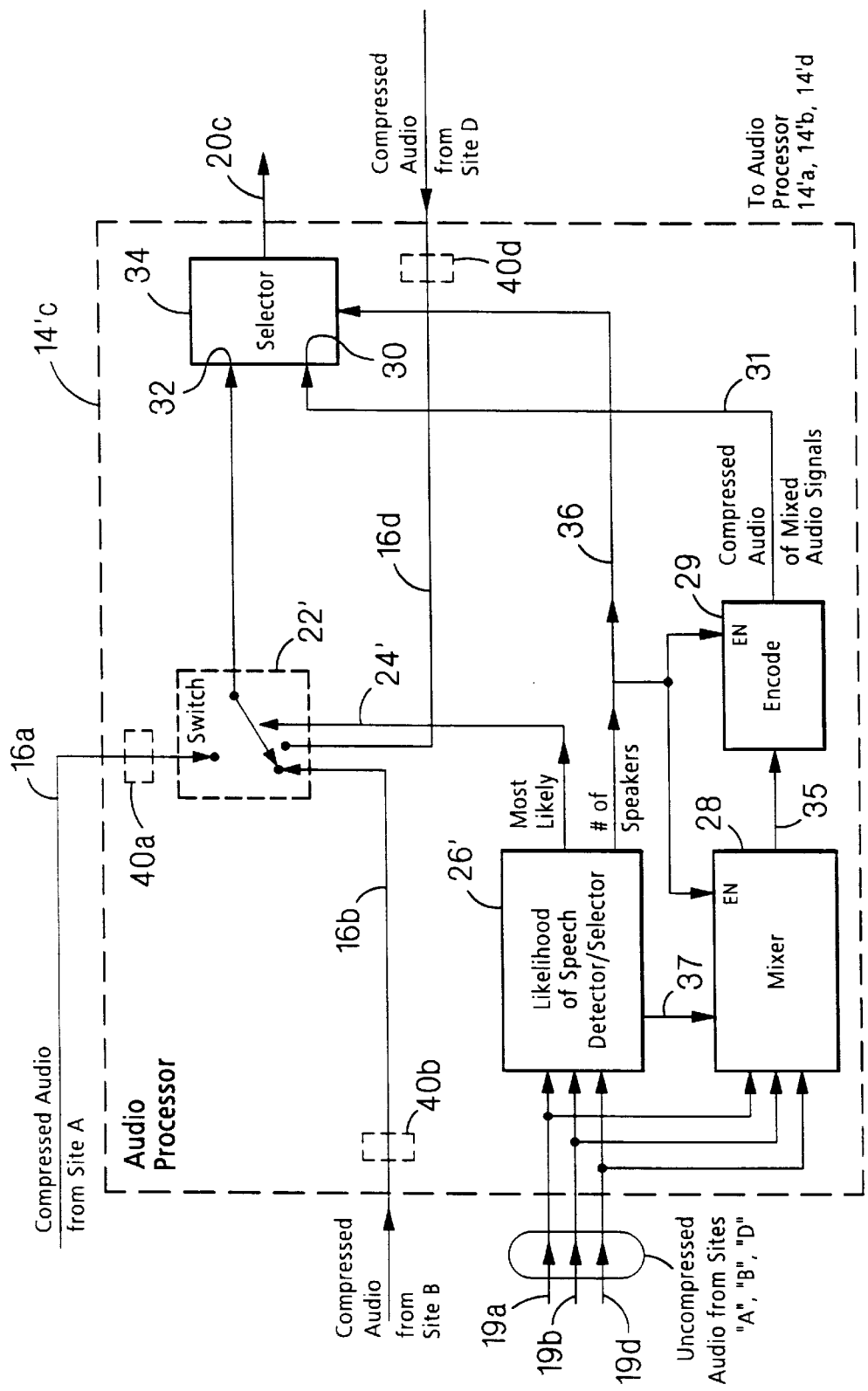
FIG. 3 is a block diagram of an alternative embodiment of an audio processor adapted for use in the conferencing system of FIG. 1.
Figure 3A:
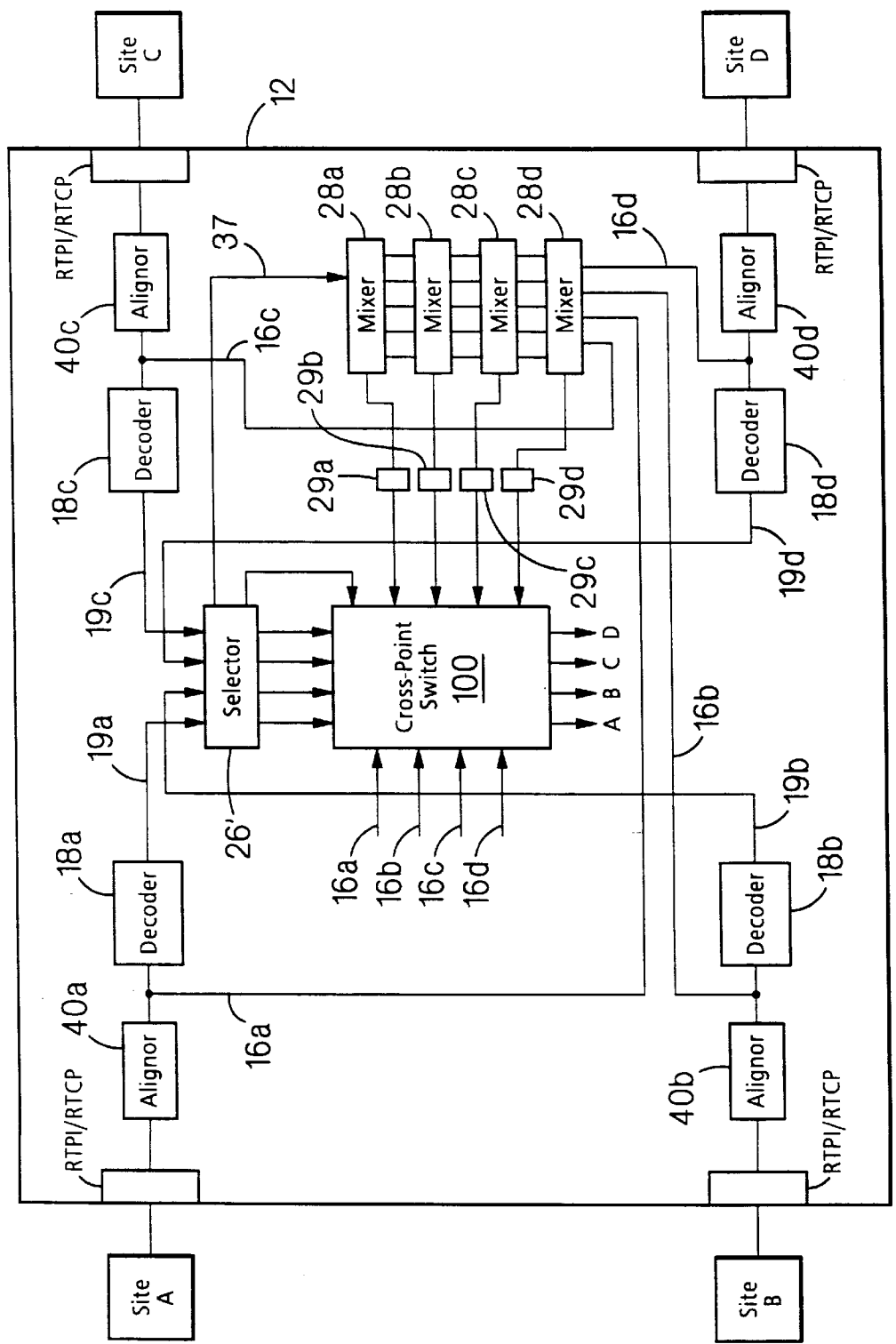
FIG. 3A is a block diagram of a particular alternate bridge configuration for mixing up to three speakers.

Referring now to FIG. 3, an alternative audio processor 14'c is shown which can be substituted for the audio processors in FIG. 2. The audio processor 14'c operates as a mixer, and is adapted to operate with, for example, end-point SITES that can receive only one audio stream. It is also applicable in situations where bandwidth is so critical that only one audio stream is transmitted to an end-point SITE, even through the end-point SITE is capable of receiving more than one audio stream.

First, considering how compressed audio is created for, for example, SITE C, the audio processor 14'c includes a switch 22' connected, as before, to the compressed audio signals on lines 16a, 16b and 16d, from SITES "A", "B", and "D", respectively (FIG. 1). The switch 22' couples one of the plurality of compressed audio signals on lines 16a, 16b, 16d to input 32 of selector (or switch) 34, selectively, in accordance with a control signal on line 24'. A selector 26' connects to the uncompressed audio signals on lines 19a, 19b, and 19d, decoded from the compressed signals from SITES "A", "B", and "D", respectively. The selector 26' includes a likelihood of speech detector and determines the one of the SITES "A", "B", or "D" with the highest (or loudest) likelihood of speech to produce the control signal on line 24'. The one of the SITES "A", "B", or "D" having the highest (or loudest) likelihood of speech is coupled to selector 34 at input 32.

The uncompressed audio signals on lines 19a, 19b and 19d from SITES "A", "B", and "D", are also fed to an audio mixer 28 to produce an uncompressed composite audio signal over a line 35. The mixed, uncompressed audio signal is fed to a time compression encoder 29 to produce a corresponding compressed composite audio signal over a line 31. The compressed composite audio signal produced by encoder 29 is fed to the other of the pair of inputs 30, 32 of selector 34, here to input 30. As noted above, the output of switch 22' is fed to input 32 of selector 34. Thus, the selector 34 is fed at one input 32 with the one of the compressed audio signals from SITES "A", "B", and "D", having the most likely (or loudest) speaker and the other one of the inputs 30 is fed with the time compressed composite (mixed) audio signal produced by the encoder 29.

The selector 26', in addition to determining the likelihood of speech at each of the SITES "A", "B", and "D", also determines whether more than person is speaking at those sites at the same time. If more than one person is speaking at the same time, (a double-talk, triple-talk, etc., condition) a logic "1" signal is fed to line 36; otherwise the selector 26' produces a logic "0" signal. Line 36 is fed to enable terminals (EN) of the mixer 28 and decoder 29 and also to selector 34. If the logic signal on line 36 is logic "1", indicating that more than one person is speaking at the same time, the mixer 28 and encoder 29 are enabled and selector 34 couples the time compressed composite audio signal produced by the encoder 29 through the selector 34 to the SITE "C", over line 20c. Otherwise, when only one person is speaking, that is, when the logic signal on line 36 is logic "0", the mixer 28 and encoder 29 are not enabled and the selector 34 couples the selected one of the compressed audio signals on lines 16a, 16b, 16d, having the most likelihood of speech, through the selector 34 to the SITE "C", over line 20c.

Thus, with the audio controller 14'c, when two or more people at connected different sites, are talking at once, (that is, for example, "double talk") the uncompressed audio, which is used for speech detection in selector 26', is, selectively mixed (as described below) in the mixer 28 and then is encoded, that is, time compressed, in encoder 29. This mixed compressed composite audio is transmitted, through selector 34, to the end-point SITE, here SITE "C". When "double talk" is not occurring, the mixer 28 and encoder 29 are not needed, and therefore are not enabled, which, if they are implemented in software, thereby saves considerable computational resources in the bridge. In addition, there are no transcoding losses except when the audio processor is in a mixing mode.

When two or more speakers are determined to exist by selector 26' the detector provides to the mixer 28, over lines 37, signal information identifying on which of the input lines the speakers can be found. The mixer 28 can mix, depending upon its configuration, 2, 3, or more inputs to produce its mixed output over line 35. The level of mixing will depend upon the bridge configuration, including, in particular, the number of connected SITES and the desirability of hearing more than two or three speakers at the same time. The selected speakers will also depend upon, and typically be selected from SITES having, a certain minimum threshold level of speech. Alternatively, the two or three loudest speakers can be selected.

It should be noted that both the compressed audio signals on lines 16a, 16b, and 16d can be fed to aligners, 40a, 40b, 40d, respectively, prior to the switch 22' and selector 26'. Typically there is only one aligner for each site. The purpose of the aligner is to equalize any delay between the incoming streams from the SITES "A", "B", "C" and "D" (in this embodiment). The use of the aligner is optional since in many cases the audio streams are already synchronized.

It should be understood that there need be only one mixer/encoder per conference. In this configuration, for example, during double-talk, the loudest speaker will hear the second loudest. The second loudest speaker will hear the loudest speaker. Everyone else will hear a mix of the two loudest speakers. The system can be extended to mix more than the two loudest speakers. In these cases, more than one encoder is needed. For instance, if three speakers are needed in the mix, then four encoders are needed (no matter how many sites are connected). This allows the loudest speaker to hear the two next loudest speakers, and the second loudest speaker to hear the loudest speaker and the third loudest speaker. The third loudest speaker hears a mix of the two loudest speakers. Everyone else hears a mix of the three loudest speakers. Note that since "triple-talk" is even rarer than "double-talk", the computational requirements of supporting multiple encoders is not very high.

In a representative implementation of a bridge 12, in accordance with the invention, in which up to three speakers can be mixed together, the bridge 12 is connected, as before, to four SITES, SITE A, SITE B, SITE C, and SITE D. The compressed audio from the sites passes through the RTP/RTCP transport to a respective aligner 40a, 40b, 40 c, and 40d, and then to a respective decoder 18a, 18b, 18c, and 18d. The compressed output of the aligners are sent to each of four mixers 28a, 28b, 28c, and 28d and the uncompressed audio output is sent to a selector 26'. The selector controls each of the mixers over lines 37 and each mixer, when enabled, produces a mixed output to an encoder 29a, 29b, 29c, 29d, respectively, which generate appropriate output signals for the SITES A, B, C, and D. The output of the encoders is directed to a cross-point switch 100. The cross-point switch also receives the compressed inputs from the SITES, output by the aligners, over lines 16a, 16b, 16c, 16d, and is controlled by the output of the selector depending upon the relative loudness and speech content of the inputs to the selectors over lines 19a, 19b, 19c, and 19d. The output of the selector controls the cross-point switch to select either the compressed audio over lines 16 or the outputs of the encoders 29 for presentation to the various SITES over lines labeled A, B, C, and D. In this manner, a mix of up to three speakers can be provided using four mixers, four encoders, but only one selector and one cross-point switch. In the preferred embodiment of the invention, the mixer/encoders and selector, as well as the aligners and decoders, are all implemented in software. Thus, if the mixers need not be used and transcoding is not employed, not only is audio quality increased, but the computational savings are significant.

The TABLE below illustrates the results, for a variety of interruption rates. The TABLE assumes that each interruption lasts for 2 seconds and that there are five possible speakers. Even with a high probability of interrupts, the average encoder load per conference is very low—here, less than one encoder per conference. Note that in a classic audio mixer, there is one encoder per endpoint SITE.

TABLE

| Interruptions Per Minute | 0.5 | 1 | 2 | 3 | 4 | 5 |
| --- | --- | --- | --- | --- | --- | --- |
| Probability of Interruption | 0.016667 | 0.033333 | 0.066667 | 0.1 | 0.133333 | 0.366667 |
| Probability of no Interruption | 0.983333 | 0.966667 | 0.933333 | 0.9 | 0.866667 | 0.833333 |
| Probability of 0 mixer | 93.50% | 87.32 | 75.88% | 65.61% | 56.42% | 48.23% |
| Probability of 1 mixer | 6.34% | 12.05 | 21.68% | 29.16% | 34.72% | 38.58% |
| Probability of 2 mixers | 0.16% | 0.62% | 2.32% | 4.86% | 8.01% | 11.56% |
| Probability of 3 mixers | 0.00% | 0.01% | 0.11% | 0.36% | 0.82% | 1.54% |
| Probability of 4 mixers | 0.00% | 0.00% | 0.00% | 0.01% | 0.03% | 0.08% |
| Encoders Needed (average) | 0.07 | 0.13 | 0.27 | 0.40 | 0.53 | 0.67 |

The system shown in FIG. 2 can be used, as noted above, with end-point SITES which are only receiving one audio stream. The end-point SITES will have all of the benefits of full audio mixing, with much less computational load on the bridge 12. In addition, the audio quality during non-interrupted speech is superior to an audio mixer, since no transcoding is performed during this time. This is particularly advantageous in the bridge to bridge connection of FIG. 2C. If traditional mixers are used, the transcoding losses limit the number of servers that can be cascaded. Three bridges is the typical recommended limit. With audio processors, such as processor 14'c, transcoding losses only occur during interruptions. Since the meeting is usually difficult to follow in these situations anyway, the transcoding loss is of less concern. Therefore, this invention increases the number of bridges that can be cascaded.

Other features are within the spirit and scope of the appended claims.

What is claimed is:

1. A method for distributing audio signals from one of a plurality of audio sources to an output, comprising the steps of:
   receiving compressed audio signals from each one of the plurality of audio sources at an audio processor;
   decompressing the compressed received audio signals;
   coupling the compressed audio signal from one of the plurality of audio sources to the output, selectively, based upon speech information detected in the uncompressed audio signals from the plurality of audio sources;
   mixing selected ones of the uncompressed audio signals, based upon said speech information, from the plurality of audio sources into a uncompressed composite audio signal;
   compressing the uncompressed composite signal into a corresponding compressed composite signal; and
   coupling the compressed composite signal to the output when speech audio signals are detected from more than one source and coupling the selected one of the compressed audio signals to the output when speech is detected from only one of the sources.

2. A method of distributing audio signals from one of a plurality of audio sources to an output, comprising the steps of:
   receiving compressed audio signals from each one of the plurality of audio sources at an audio processor;
   decompressing the compressed received audio signals;
   coupling one of the plurality compressed audio signal from one of the plurality of audio sources to the output selectively based upon the uncompressed audio signals from the plurality of audio sources;
   mixing, selectively, the uncompressed audio signals from the plurality of audio sources to generate a uncompressed composite audio signal whenever at least two audio sources are active, and
   connecting either the uncompressed composite signals or the selected one of the compressed audio signals to the output selectively based upon the uncompressed audio signals.

3. The method recited in claims 2 further comprising the steps of
   determining from the uncompressed audio signals the number of audio sources producing a predetermined type of audio signal; and
   said connecting step comprises connecting either the uncompressed composite signal or the selected one of the compressed audio signals to the output selectively based upon the determined number of audio sources.

4. The method recited in claim 3 wherein the predetermined type of audio signal is speech.

5. The method recited in claim 4 wherein the selected one of the compressed audio signals is coupled to the output when the determined number of speech producing sources is one.

6. An audio processor for distributing audio signals from one of a plurality of audio sources to an output, comprising:
   a switch, connected to compressed audio signals from each one of the plurality of audio sources, for coupling one of the plurality of compressed audio signals to the output selectively in accordance with a control signal;
   a selector connected to the uncompressed audio signals, derived from the compressed audio signals, from the plurality of audio sources, for producing the control signal based upon speech information detected in the uncompressed audio signals from the plurality of audio sources;
   a mixer for selectively combining the uncompressed audio signals from the plurality of audio sources into an uncompressed composite audio signal;
   an encoder connected to the uncompressed composite signals, for producing a corresponding compressed composite signal; and
   a selector for coupling the compressed composite signal to the output when speech audio signals are detected from more than one source and for coupling the selected one of the compressed audio signals to the output when speech is detected from only one of the sources.

7. An audio processor for distributing audio signals from one of a plurality of audio sources to an output, said processor, comprising:
   a switch connected to compressed audio signals from each one of the plurality of audio sources, for coupling one of the plurality of compressed audio signals to the output selectively in accordance with a control signal;
   a selector fed by the uncompressed audio signals, derived from the compressed audio signals, from the plurality of audio sources, for producing the control signal based upon the uncompressed audio signals from the plurality of audio sources;

a mixer for selectively combining the uncompressed audio signals from the plurality of audio sources into an uncompressed composite audio signal;

an encoder, connected to the uncompressed composite signal, for producing a corresponding compressed composite signal; and a second selector for coupling either the selected one of the compressed audio signals or the compressed composite signal to the output, based upon the uncompressed audio signals.

8. An audio processor for distributing audio signals from one of a plurality of audio sources to an output, said processor, comprising:

a switch connected to compressed audio signals from each one of the plurality of audio sources, for coupling one of the plurality of compressed audio signals to the output selectively in accordance with a control signal;

a selector fed by the uncompressed audio signals, derived from the compressed audio signals, from the plurality of audio sources, for producing the control signal based upon the uncompressed audio signals from the plurality of audio sources;

a mixer for selectively combining the uncompressed audio signals from the plurality of audio sources into an uncompressed composite audio signal;

an encoder, connected to the uncompressed composite signal, for producing a corresponding compressed composite signal; and a second selector for determining from the uncompressed audio signals the number of audio sources producing a predetermined type of audio signal and coupling either the selected one of the compressed audio signals or the compressed composite signal to the output, selectively, based upon the predetermined type of audio signal.

9. An audio processor for distributing audio signals from one of a plurality of audio sources to an output, said processor, comprising:

a switch connected to compressed audio signals from each one of the plurality of audio sources, for coupling one of the plurality of compressed audio signals to the output selectively in accordance with a control signal;

a selector fed by the uncompressed audio signals, derived from the compressed audio signals, from the plurality of audio sources, for producing the control signal based upon the uncompressed audio signals from the plurality of audio sources;

a mixer for selectively combining the uncompressed audio signals from the plurality of audio sources into an uncompressed composite audio signal;

an encoder, connected to the uncompressed composite signal, for producing a corresponding compressed composite signal; and a second selector for determining from the uncompressed audio signals the number of audio sources producing a predetermined type of audio signal and for coupling either the selected one of the compressed audio signals or the compressed composite signal to the output, selectively based upon the predetermined type of audio signal, wherein the predetermined type of audio signal is speech.

10. An audio processor for distributing audio signals from one of a plurality of audio sources to an output, said processor, comprising:

a switch connected to compressed audio signals from each one of the plurality of audio sources, for coupling one of the plurality of compressed audio signals to the output selectively in accordance with a control signal;

a selector fed by the uncompressed audio signals, derived from the compressed audio signals, from the plurality of audio sources, for producing the control signal based upon the uncompressed audio signals from the plurality of audio sources;

a mixer for selectively combining the uncompressed audio signals from the plurality of audio sources into an uncompressed composite audio signal;

an encoder, connected to the uncompressed composite signal, for producing a corresponding compressed composite signal; and a second selector for determining from the uncompressed audio signals the number of audio sources producing a predetermined type of audio signal and for coupling either the selected one of the compressed audio signals or the compressed composite signal to the output selectively in accordance with the predetermined type of audio signal and determined by the number of audio sources producing such predetermined type of audio signal.

* * * * *